United States Patent [19]

Totty et al.

[11] Patent Number: 5,221,873
[45] Date of Patent: Jun. 22, 1993

[54] PRESSURE TRANSDUCER WITH QUARTZ CRYSTAL OF SINGLY ROTATED CUT FOR INCREASED PRESSURE AND TEMPERATURE OPERATING RANGE

[75] Inventors: Charles D. Totty; John R. Dennis, both of Duncan, Okla.

[73] Assignee: Halliburton Services, Duncan, Okla.

[21] Appl. No.: 823,734

[22] Filed: Jan. 21, 1992

[51] Int. Cl.$^5$ .................................. H01L 41/08
[52] U.S. Cl. ..................... 310/361; 310/338; 310/369; 310/367
[58] Field of Search ............ 310/338, 339, 360, 361, 310/367

[56] References Cited

U.S. PATENT DOCUMENTS

| Re. 25,413 | 7/1963 | Sogn | 310/361 |
|---|---|---|---|
| 2,111,383 | 3/1938 | Bokovoy | 310/361 |
| 2,282,369 | 5/1942 | Mason | 310/361 X |
| 2,645,727 | 7/1953 | Willard | 310/361 X |
| 3,376,439 | 4/1968 | Vasin et al. | 310/361 |
| 3,561,832 | 2/1971 | Karrer et al. | 310/361 X |
| 3,617,780 | 11/1971 | Benjaminson et al. | 310/361 X |
| 3,683,213 | 8/1972 | Staudte | 310/9.6 |
| 3,826,931 | 7/1974 | Hammond | 310/8.1 |
| 4,020,448 | 4/1977 | Corbett | 340/8 S |
| 4,035,674 | 7/1977 | Oguchi et al. | 310/9.5 |
| 4,067,241 | 1/1978 | Corbett | 73/717 |
| 4,079,280 | 3/1978 | Kusters et al. | 310/318 |
| 4,160,183 | 7/1979 | Kusters et al. | 310/315 |
| 4,175,243 | 11/1979 | Corbett | 310/338 |
| 4,178,566 | 12/1979 | Kawashima | 331/156 |
| 4,245,173 | 1/1981 | Zumsteg et al. | 310/361 |
| 4,297,610 | 10/1981 | Ito et al. | 310/370 |
| 4,388,548 | 6/1983 | Vanghelowe | 310/361 X |
| 4,418,299 | 11/1983 | Momosaki | 310/361 |
| 4,429,248 | 1/1984 | Chuang | 310/370 |
| 4,437,773 | 3/1984 | Dinger et al. | 374/117 |
| 4,439,705 | 3/1984 | Corbett | 310/338 |
| 4,454,443 | 6/1984 | Lukaszek et al. | 310/348 |
| 4,472,656 | 9/1984 | Franx | 310/361 |
| 4,485,323 | 11/1984 | Corbett | 310/338 |
| 4,498,344 | 2/1985 | Dinger | 73/778 |
| 4,507,970 | 4/1985 | Dinger | 73/702 |
| 4,512,198 | 4/1985 | Sinha et al. | 73/703 |
| 4,535,638 | 8/1985 | EerNisse et al. | 73/862.59 |
| 4,547,691 | 10/1985 | Valdois et al. | 310/361 |
| 4,550,610 | 11/1985 | EerNisse | 73/702 |
| 4,562,375 | 12/1985 | Besson et al. | 310/361 |
| 4,592,663 | 6/1986 | EerNisse et al. | 374/117 |
| 4,741,213 | 5/1988 | Hojoh | 73/702 |
| 4,802,370 | 2/1989 | EerNisse et al. | 73/702 |
| 4,866,607 | 9/1989 | Anderson et al. | 364/422 |
| 4,936,147 | 6/1990 | EerNisse et al. | 73/702 |
| 5,012,151 | 4/1991 | EerNisse et al. | 310/346 |

FOREIGN PATENT DOCUMENTS 0056783 7/1982 European Pat. Off. .

OTHER PUBLICATIONS

Pp. 367 and 371–376 of *Physical Acoustics Principles and Methods*, vol. I, Part A, by Warren P. Mason (1964).

Primary Examiner—Mark O. Budd
Attorney, Agent, or Firm—James R. Duzan; E. Harrison Gilbert, III

[57] ABSTRACT

A pressure transducer comprises a quartz crystal having an orientation within a range of angles between about −25° and about −45° relative to the Z axis of X, Y and Z crystallographic axes. Such a pressure transducer provides a useful pressure response at pressures and temperatures above those of the operating ranges of pressure transducers using AT-cut or BT-cut quartz crystals.

3 Claims, 4 Drawing Sheets

PRESSURE TRANSDUCER WITH QUARTZ CRYSTAL OF SINGLY ROTATED CUT FOR INCREASED PRESSURE AND TEMPERATURE OPERATING RANGE

BACKGROUND OF THE INVENTION

This invention relates generally to quartz pressure transducers and more particularly to quartz pressure transducers having thickness shear mode quartz crystal resonators.

Pressure, such as in an oil or gas well, for example, can be measured in a known manner using a quartz pressure transducer. Such a transducer includes a quartz crystal resonator which is a piezoelectric element that changes an electrical characteristic of an electrical circuit in response to mechanical stress induced in the resonator by the pressure to be measured. Typically, the resonator is part of an oscillator circuit that generates a sinusoidal electrical signal having a frequency which varies with the response of the resonator.

One type of pressure transducer, particularly suited for sensing pressure in an oil or gas well, has a thickness shear mode quartz crystal resonator. In a thickness shear mode quartz crystal resonator, electrodes are affixed to the two major surfaces of the resonator and the electrical response arises from stress across the thickness of the resonator, which thickness is perpendicular to the major surfaces. Although others have been proposed, two particular thickness shear mode quartz crystal resonators extensively, if not exclusively, used include either AT-cut quartz crystal or BT-cut quartz crystal.

AT-cut and BT-cut quartz crystal resonators are useful at least in part because their response to pressure is substantially independent of temperature. That is, these resonators are said to have a zero temperature coefficient of frequency. Both of these particular resonators are, however, limited as to the maximum pressure and temperature at which they can be used. This limitation is reached when the stress on the resonator reaches a maximum level at or beyond which the quartz crystal either fractures or "twins".

For a BT-cut resonator, the primary failure is fracturing. This can occur such as at approximately 12,000 pounds per square inch (psi) at about 175 degrees centigrade (°C.) for one particular embodiment of the BT-cut pressure sensor. For an AT-cut resonator, the primary failure is "twinning". For one particular embodiment, this can occur such as at approximately 20,000 psi at about 175° C. or approximately 16,000 psi at about 200° C. or some other comparable combination of pressure and temperature which would result in the maximum allowable stress level in the resonator. For another embodiment of the AT-cut sensor, this can occur at approximately 20,000 psi at about 200° C. or approximately 25,000 psi at about 175° C. or some comparable combination of pressure and temperature.

When quartz "twins" due to excessive stress, the crystalline structure is suddenly altered to a more stable state. For AT-cut crystal, an electrical twin of this type can be regarded as a 180° rotation about the Z-axis of the X, Y and Z crystallographic axes relative to which the crystal can be oriented in known manner. Theoretically, a twin could be reversed by applying to the resonator a stress pattern that would make the original state the lower energy state for the stress pattern applied. This is not presently practical; therefore, once a crystal is twinned it remains in that state. The pressure response of the AT-cut crystal in the twinned state is more sensitive to temperature than in its original, untwinned state. Furthermore, when a crystal twins, it typically does so only partially. Such a partially or imperfectly twinned crystal cannot be made to resonate so that it is not useful as a resonator of the types referred to herein.

Because of the maximum pressure and temperature limitations of the widely used AT-cut and BT-cut resonators, there is the need for an improved pressure transducer having a quartz crystal of such a type as to enable its use in place of AT-cut or BT-cut crystal throughout the normal operating range of AT-cut and BT-cut crystals as well as at higher pressures and temperatures and yet provide a suitable pressure response.

SUMMARY OF THE INVENTION

The present invention overcomes the above-noted and other shortcomings of the prior art by providing a novel and improved pressure transducer meeting the aforementioned need. The novel and improved pressure transducer includes a quartz crystal that is cut within a range of angles relative to the Z axis of X, Y and Z crystallographic axes to enable use of the transducer over extended pressure and temperature ranges relative to the operating ranges of conventional pressure transducers using AT-cut or BT-cut crystals.

The present invention generally provides a pressure transducer comprising a quartz crystal having an orientation within a range of angles between about −25° and about −45° relative to the Z axis of X, Y and Z crystallographic axes. The present invention more particularly provides a pressure transducer comprising a substantially cylindrical thickness shear mode quartz crystal resonator having substantially parallel major surfaces cut parallel to an orientation singly rotated about the X axis of X, Y and Z crystallographic axes at an angle within a range between about −25° and about −45° relative to the Z axis.

The present invention also provides a method of monitoring a high pressure, high temperature environment. This method comprises sensing pressure in the environment, wherein pressure is at least about 20,000 psi and wherein temperature is at least about 200° C, with a quartz crystal of single rotation cut having an angle within a range between about −25° and about −45° relative to the Z axis of X, Y and Z crystallographic axes so that the quartz crystal does not fracture or twin in response to the pressure and temperature in the environment.

In a more particular embodiment, the angle of the cut of the quartz crystal is within the range between about −25° and about −35° relative to the Z axis. Even more particularly, the quartz crystal is oriented at an angle equivalent to a twinned AT-cut crystal.

Therefore, from the foregoing, it is a general object of the present invention to provide a novel and improved pressure transducer. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

Figure 1:
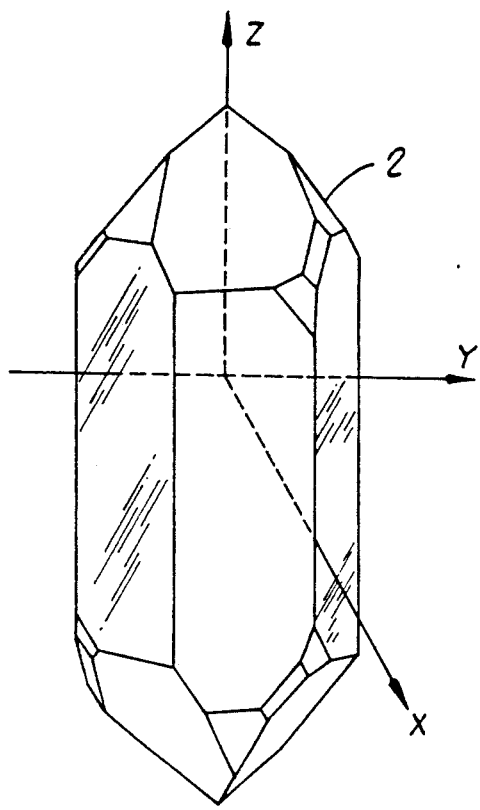
FIG. 1 shows a quartz crystal oriented relative to X, Y and Z crystallographic axes.

In FIG. 1, a quartz crystal 2 is shown oriented relative to X, Y and Z crystallographic axes. The X axis is the electrical axis, the Y axis is the mechanical axis and the Z axis is the optical axis in accordance with convention in the art. The proper orientation of the crystal 2 relative to the axes can be made in a manner known in the art, such as by using a known x-ray diffraction technique.

Figure 2:
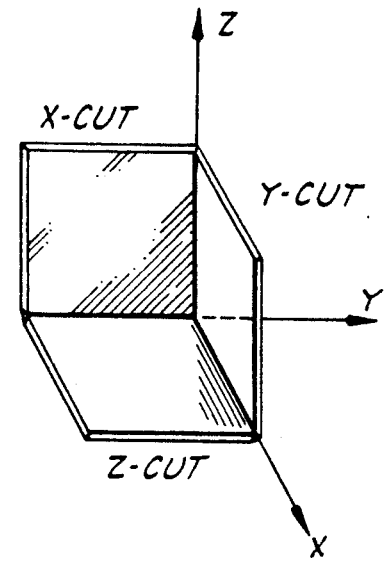
FIG. 2 shows the orientation of conventional X-cut, Y-cut and Z-cut planes relative to the X, Y and Z crystallographic axes.
Figure 3:
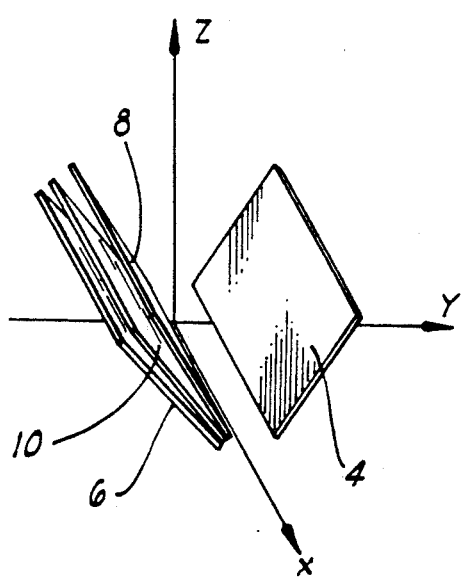
FIG. 3 depicts the planes at the limits of the range of cuts for quartz crystal resonators of the pressure transducers of the present invention, and it also depicts the planes for the conventional AT-cut and BT-cut resonators.

From the orientation shown in FIG. 1, the crystal 2 can be cut in a known manner at one or more angles relative to one or more of the crystallographic axes. By way of illustration, conventional X-cut, Y-cut and Z-cut orientations are shown in FIG. 2. Referring to FIG. 3, the orientations of the major faces of conventional AT-cut and BT-cut thickness shear mode quartz crystal resonators are depicted. The AT-cut crystal's and the BT-cut crystal's major surfaces to which electrodes would be applied in a pressure transducer of the type to which the present invention pertains are parallel to or inclusive of the planar surfaces 4, 6, respectively, shown in FIG. 3. The planar surface 4 is rotated about the X axis from the Z axis at an angle of $+35° 15'$, and the planar surface 6 is rotated about the X axis from the Z axis at an angle of $-49°$. As thickness shear mode resonators, AT-cut and BT-cut crystals have thicknesses substantially less than the diameters or maximum linear dimensions of their major surfaces.

Also depicted in FIG. 3 are two planar surfaces 8, 10 representing the angular limits of the range of cut orientations for the quartz crystals included in the pressure transducers of the present invention. The surface 8 is rotated about the X axis from the Z axis at an angle of about $-25°$, and the surface 10 is rotated about the X axis from the Z axis at an angle of about $-45°$. Thus, a quartz crystal resonator of the present invention has its major surfaces cut at an angle within this range between about $-25°$ and about $-45°$. If $\phi$ designates the angle relative to the Z axis and $\theta$ designates the angle relative to the X axis, then the major surfaces of the quartz crystal used in the present invention have an orientation within the range $\phi=$ about $-25°$ to about $-45°$ and $\phi=0°$; therefore, the quartz crystal of the present invention has a single rotation cut. A more preferred range is $\phi=$ about $-25°$ to about $-35°$ and $\phi=0°$.

A particularly preferred orientation is at an angle $\phi=-35° 15'$ so that the quartz crystal is cut equivalent to a fully or perfectly twinned AT-cut crystal. Although this particular orientation yields a resonator having a pressure response with greater temperature sensitivity than a conventional AT-cut quartz crystal resonator, we have found that a quartz crystal resonator of this particular orientation of the present invention has an acceptable pressure response as well as a greater operating range than either the AT-cut or BT-cut quartz crystal resonator.

Figure 3A:
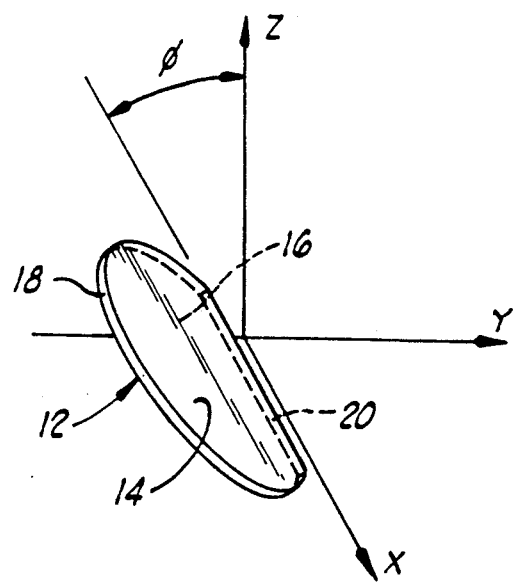
FIG. 3A depicts a thickness shear mode quartz crystal resonator oriented in accordance with the present invention.

In the preferred embodiments, a quartz crystal resonator of the present invention is substantially cylindrical. That is, the outer periphery of the major surfaces of the crystal is circular except for preferably a flattened portion of the edge provided for externally indicating the orientation. Such a flattened edge for this purpose, as well as the preferably cylindrical shape, have been used in prior quartz crystal resonators. Such a configuration oriented at an angle $\phi$ within the range of the present invention is illustrated by quartz crystal resonator 12 shown in FIG. 3A. The substantially circular major surfaces 14, 16 are parallel. Generally cylindrical edge 18 has a flat 20 for orientation as previously described.

Figure 4:
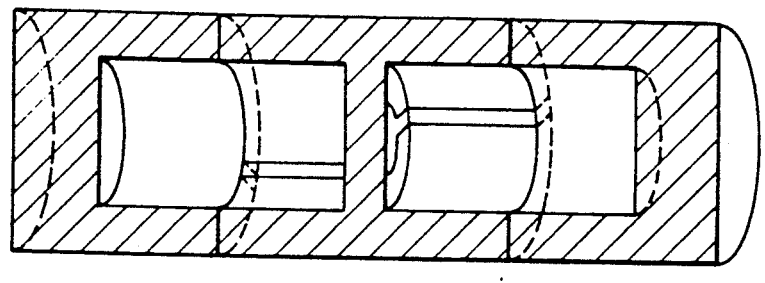
FIGS. 4-10A depict known pressure transducers as examples of structural configurations which the pressure transducers of the present invention can take.
Figure 5:
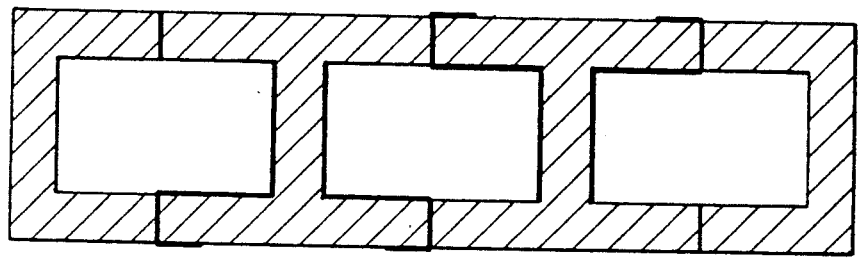
Figure 6:
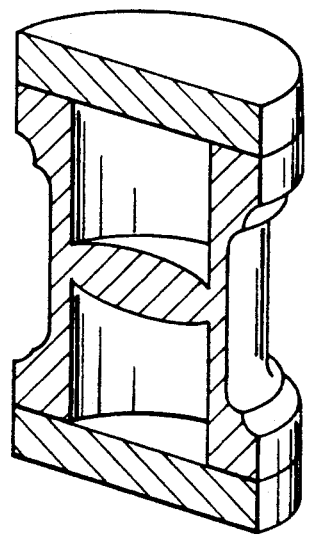
Figure 7:
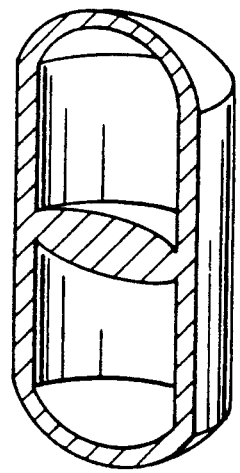
Figure 8:
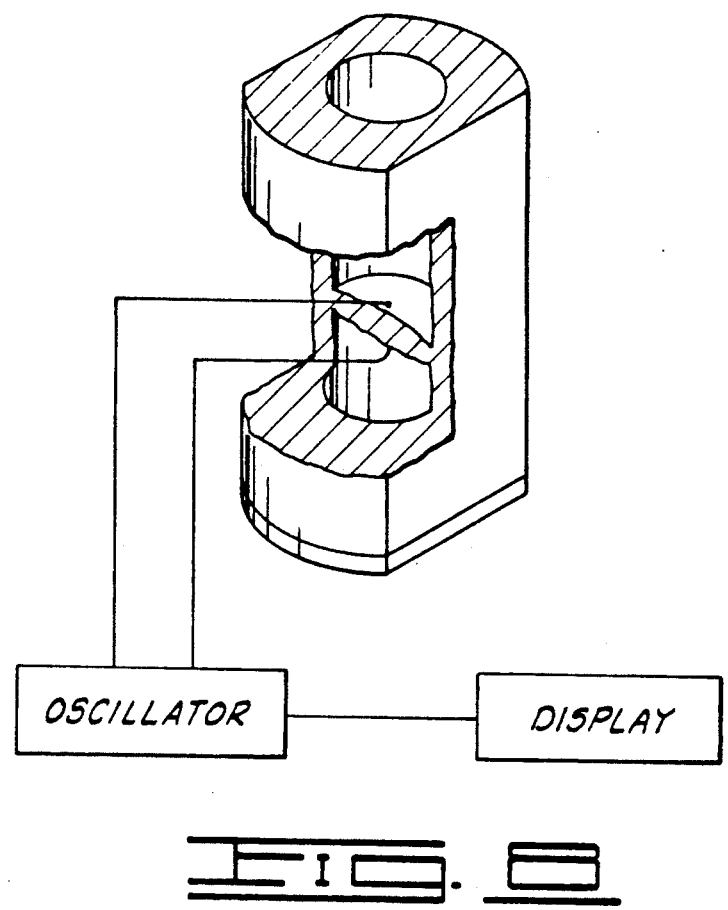
Figure 9:
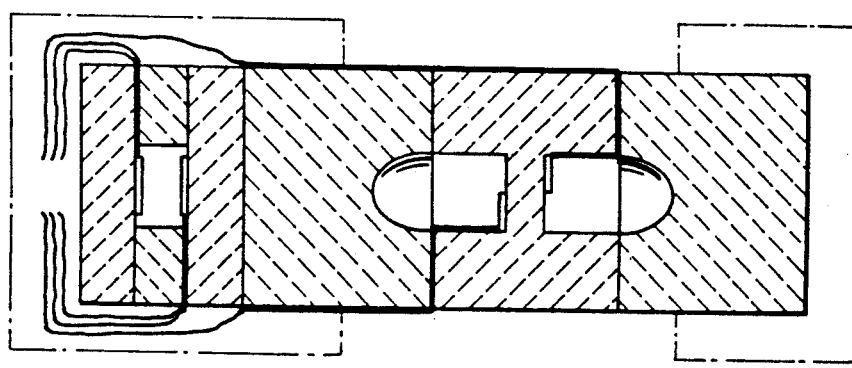

The pressure transducer of the present invention preferably comprises a crystalline housing encapsulating the quartz crystal resonator. The housing preferably has a cylindrical quartz crystal wall with which the resonator is integrally formed and to which the major surfaces of the resonator are perpendicular. Cavities are defined by the wall adjacent both major surfaces of the resonator. Matching crystalline end caps close the cavities. This type of configuration is known in the art and has been used with the aforementioned AT-cut and BT-cut quartz crystal resonators. Examples of this type of configuration are shown in FIGS. 4-9. FIGS. 4 and 5 are taken from U.S. Pat. No. 3,561,832 to Karrer et al.; FIGS. 6 and 7 are taken from U.S. Pat. No. 3,617,780 to Benjaminson et al. FIG. 8 is taken from U.S. Pat. No. 4,550,610 to EerNisse; and FIG. 9 is taken from U.S. Pat. No. 4,802,370 to EerNisse et al. These patents are incorporated herein by reference. FIGS. 6 and 7 illustrate that the major surfaces need not be planar, and thus need not by parallel. FIG. 8 illustrates the resonator connected into an oscillator circuit. Given the range of angles for the present invention as described above, how to manufacture such housing and overall pressure transducer is known in the art. A preferred technique and construction are as used in making the embodiment shown in FIGS. 10 and 10A. This is a type well-known in the art. A resonator 22 is formed of one piece then adjacent cavities are formed by the illustrated hollow end caps 24, 26. Multiple resonator configurations can be used. For example, a second crystal of the same orientation as the pressure sensor, but not exposed to the pressure, can be used as a means for compensating for temperature effects by comparing the change in frequency of the two resonators. A temperature/reference crystal can be added to the pressure sensor and/or the comparison crystal, for example.

Figure 10:
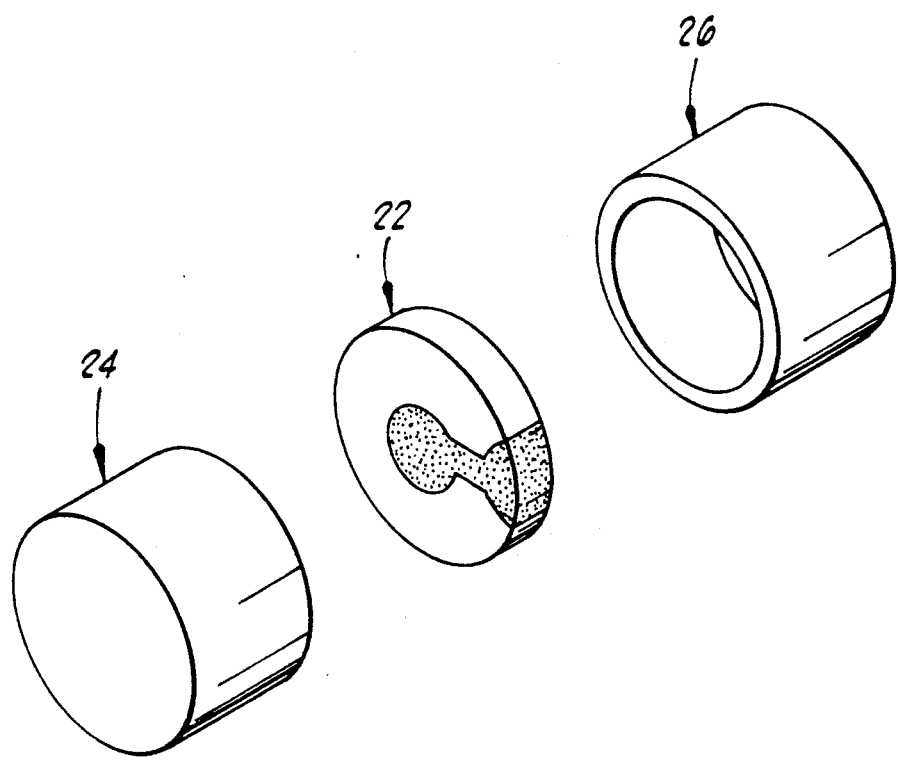
Figure 10A:
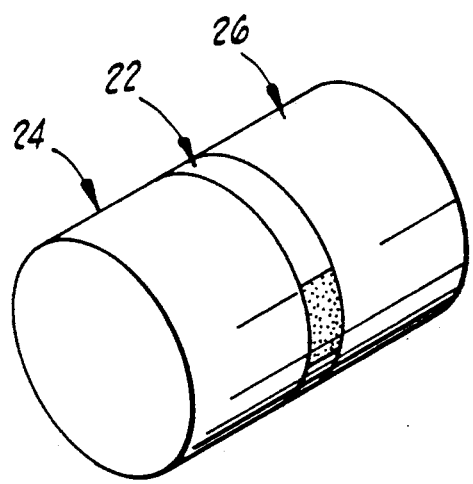

We have fabricated several pressure sensors of the type shown in FIGS. 10 and 10A but with a crystal cut in accordance with our present invention. Three different crystal orientations have been used. These are: $-35°$, $-40°$ and $-45°$ relative to the Z axis. Fabrication and assembly of the resonators and the associated end caps was performed using proven techniques. Five pressure sensors of this type have been tested to temperatures as high as 230° C, and to pressures as high as 30,000 psi. No failures were encountered. It should be noted that these temperatures and pressures are not the limits of the usefulness of the invention but are the limitations of our equipment for testing. Although we have not tested using cuts to −25°, we contemplate −25° to −35° is a preferred range because the frequency-temperature turnover moves up as the angle gets less negative. This potentially allows for higher temperature operation.

The pressure transducer described above is used in the preferred method of the present invention to monitor a high pressure, high temperature environment. This method comprises sensing pressure in the environment with a quartz crystal of single rotation cut having an angle within the aforementioned range between about −25° and about −45° relative to the Z crystallographic axis so that the quartz crystal does not fracture or twin in response to the pressure and temperature. In the preferred embodiment, such pressure can be at least about 20,000 psi at temperatures above at least about 200° C. This is an environment in which the present invention can operate, but it is beyond the lower, nominal safe operating range of conventional AT-cut and BT-cut crystals (in which lower range the present invention can also be used). How the sensing occurs is via the piezoelectric response of the quartz crystal resonator to ambient pressure, which response is detected via the oscillator circuit in which the resonator is connected as illustrated for the arrangement of FIG. 8 and as known in the art.

An oil or gas well is a specific example of an environment where the present invention can be used. For example, the pressure transducer of the present invention can be used in the downhole sensing and recording tool disclosed in U.S. Pat. No. 4,866,607 to Anderson et al., incorporated herein by reference.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of monitoring a high pressure, high temperature environment, comprising sensing pressure in the environment, wherein pressure is at least about 20,000 pounds per square inch and wherein temperature is at least about 200° C., with a quartz crystal of single rotation cut having an angle within a range between about −25° and about −45° relative to the Z axis of X, Y and Z crystallographic axes so that the quartz crystal does not fracture or twin in response to said pressure and temperature.

2. A method as defined in claim 1, wherein said range is between about −25° and about −35° relative to the Z axis.

3. A method as defined in claim 1, wherein said angle is the twin of the angle of an AT-cut quartz crystal.

* * * * *